Patented May 26, 1936

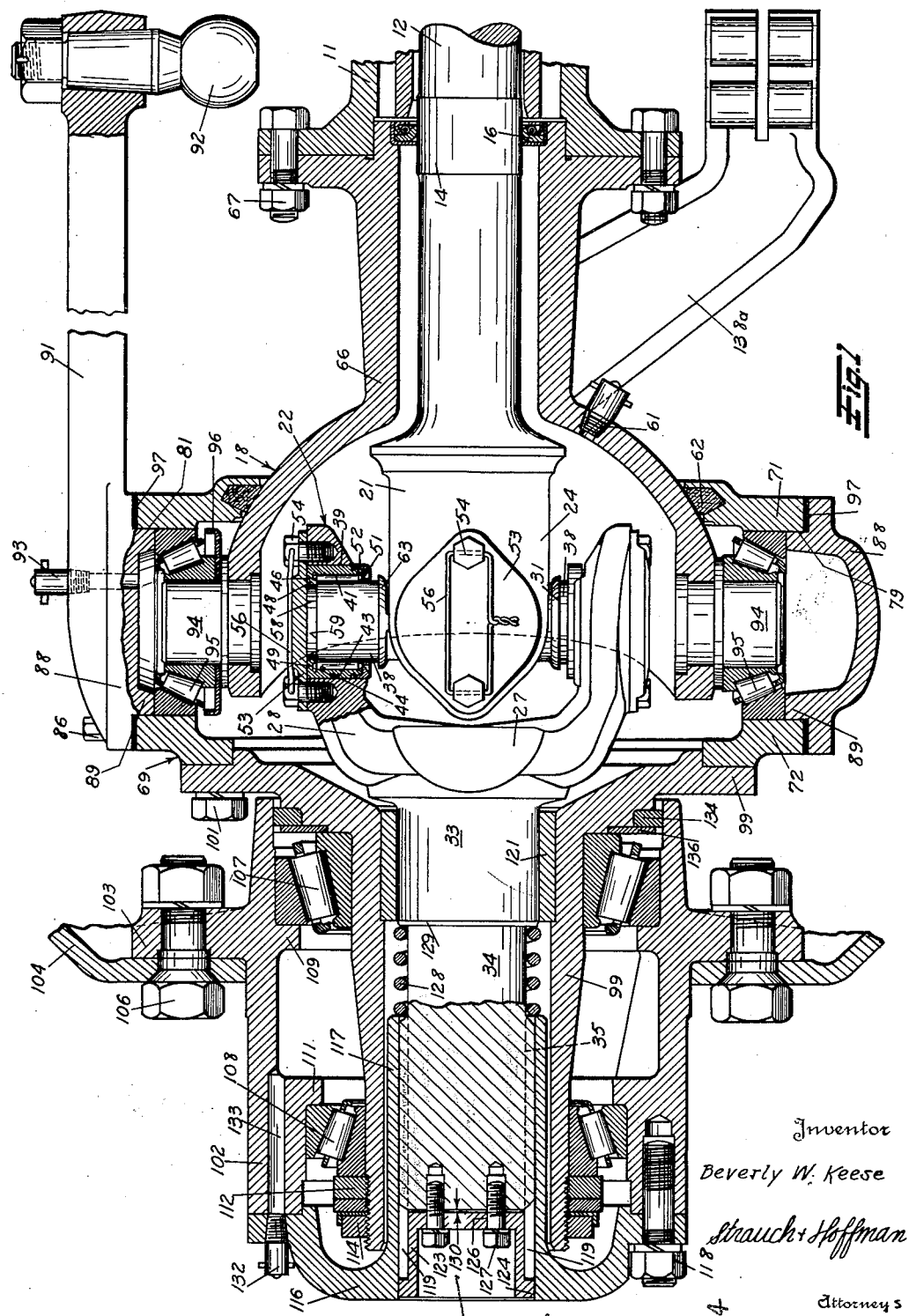

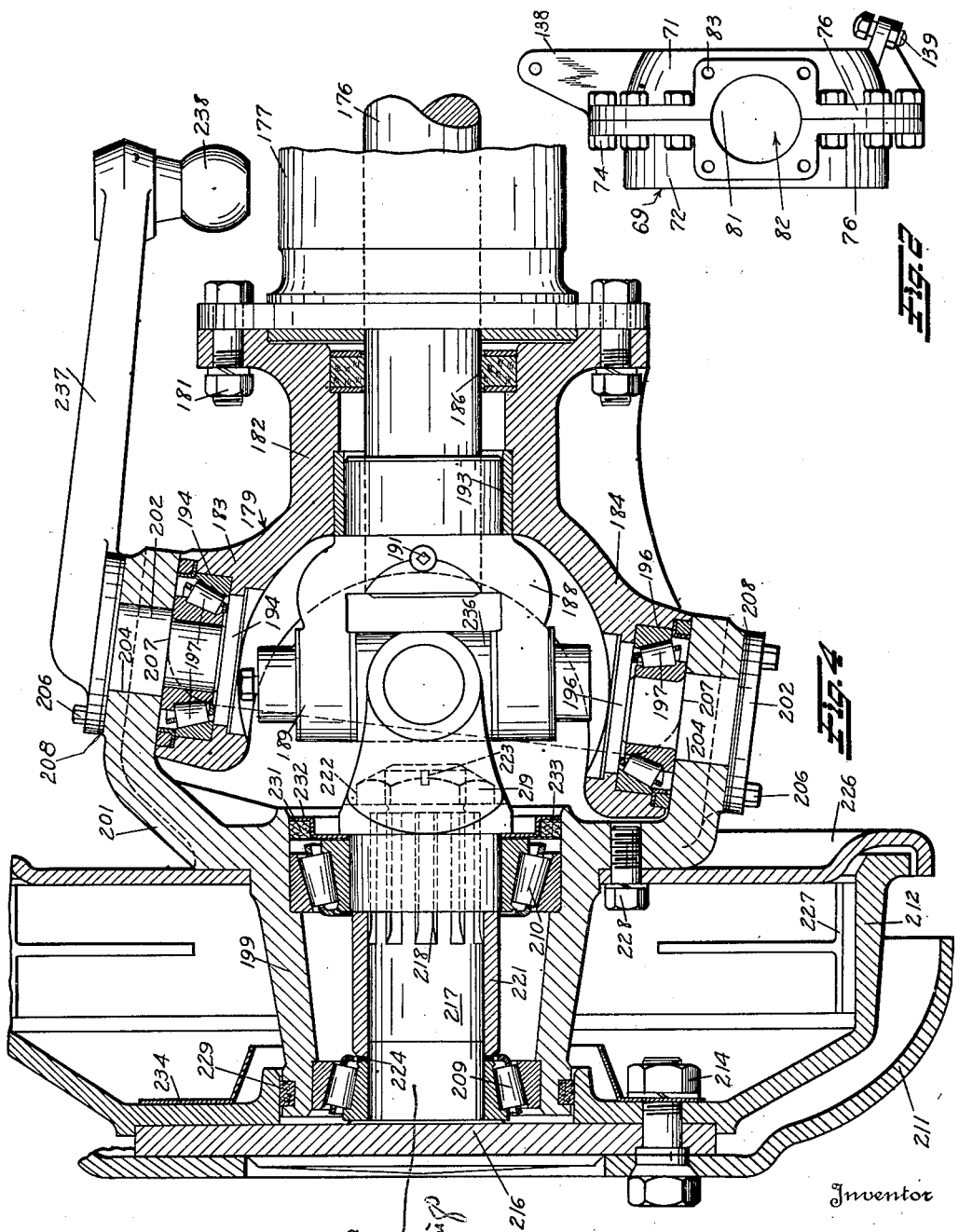

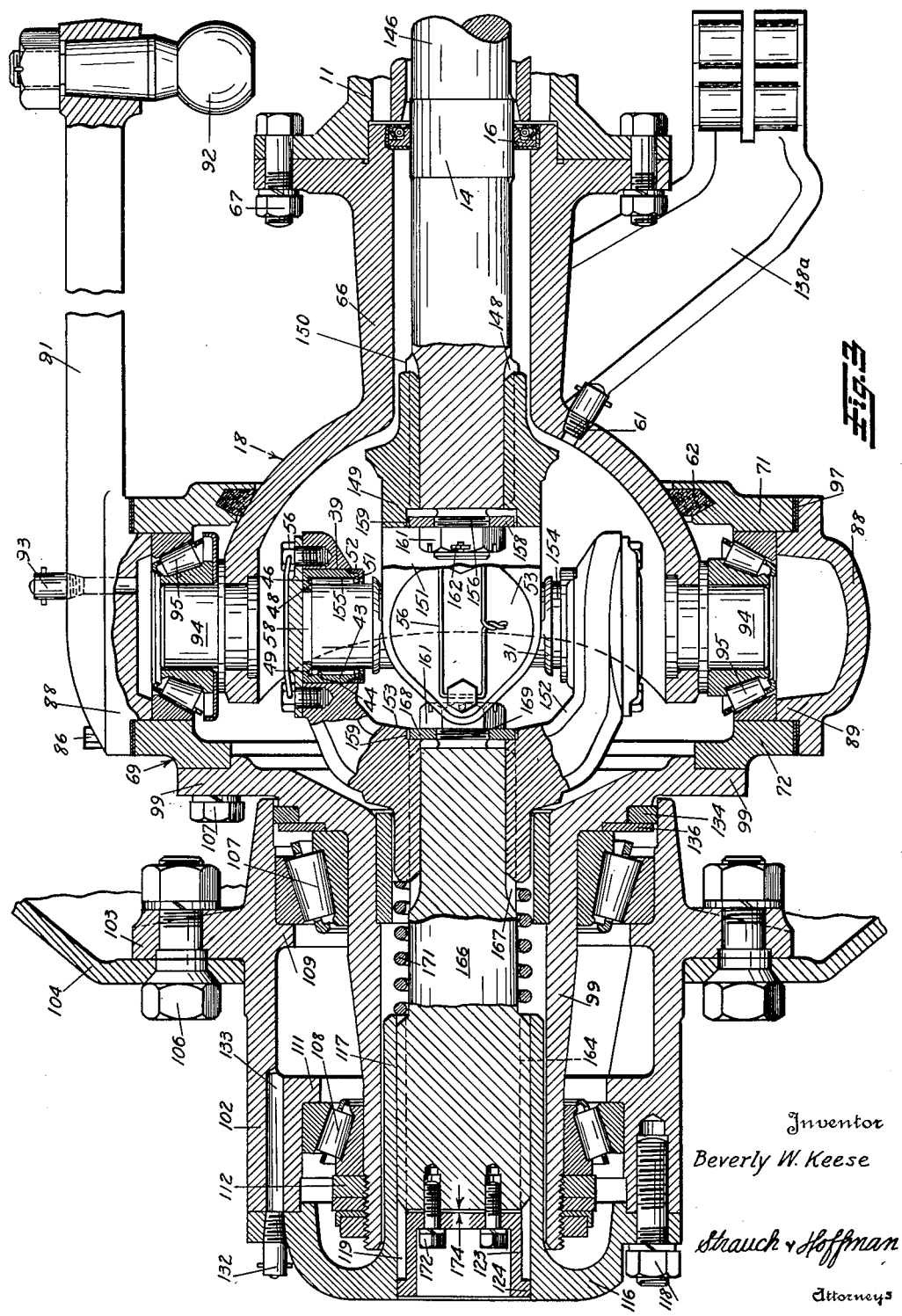

2,042,404

UNITED STATES PATENT OFFICE 2,042,404

STEERING WHEEL DRIVE FOR VEHICLES

Beverly W. Keese, Oshkosh, Wis., assignor to The Timken-Detroit Axle Company, Detroit, Mich., a corporation of Ohio Application April 4, 1934, Serial No. 719,028

8 Claims. (Cl. 180—43)

The present invention relates to wheel mountings for vehicles and more particularly to a mounting for driven wheels and flexible drive connections permitting dirigibility of the wheels.

The invention also relates to novel means for adjusting the flexible drive connection with respect to the pivotal axis about which the drive wheel swivels for steering movements.

The primary object of the present invention is to provide for the driven steering wheel of a vehicle, a wheel mounting and flexible driving construction which is compact and sturdy and which may be manufactured at a comparatively low cost.

Another object of the present invention is to provide a drive for vehicle steering wheels in which the vehicle wheels are driven through universal joints of the trunnion type having trunnion bearings comprising bearing elements in the form of relatively thin needles surrounding the trunnions whereby the useful life of the universal joint is substantially prolonged and the load transmitting capacity is greatly increased for a given size of joint thereby permitting the use of a more compact wheel mounting.

In a drive axle provided with a flexible drive connection for the vehicle wheel, it is difficult to obtain even an approximately exact disposition of the center point of the flexible coupling within the swiveling axis of the wheel due to manufacturing variations. This misalignment of the parts causes loss of efficiency and undue wear when the axle is operating with the wheels turned at an angle to provide for steering.

Therefore it is a further object of the present invention to provide for adjusting the position of the flexible coupling, which imparts driving force to the dirigible road wheel in a steering drive wheel mounting, so that its center may be always maintained within the axis about which the road wheel is turned for steering movement. The latter feature of my invention is of special importance where universal joints equipped with needle bearings in accordance with this invention are used as misalignment of the parts interferes with the proper functioning of the needles comprising the bearings for the joint trunnions.

Therefore it is still another object of the present invention to provide adjusting means for insuring alignment of the center of a needle bearing equipped universal joint with the swiveling axis of a vehicle steering wheel driven through said joint whereby undue cramping of the joint is substantially eliminated so that the needle bearings may function in the intended manner.

It is still another object of the present invention to provide a steering drive axle in which the universal joint or flexible coupling, operatively interconnecting the drive member of the axle and the road wheel driven thereby, is formed integral with a stub shaft that is associated with and drives said wheel.

A still further object of the present invention is to provide, in a steering wheel drive, for adjustment of the universal joint and the driving and driven shafts connected thereto as a unit, whereby the point of intersection of the axes of said shafts when angularly disposed may be maintained substantially in the axis about which the drive wheel swivels for steering purposes.

Still another object of the present invention is to provide a mounting for a driven vehicle steering wheel wherein the wheel bearing is housed within a pivotally mounted non-rotatable spindle.

A further object of the present invention is to provide a mounting for a driven dirigible wheel wherein the flexible coupling which imparts driving torque to the wheel is supported by and rotates upon the wheel bearing.

Still another object of the present invention is to provide an integral wheel mounting member and driving shaft therefor designed for direct connection with one yoke of a universal joint.

Still another object of the present invention is to provide a mounting for a driven vehicle steering wheel wherein a drive shaft integral with a wheel mounting member and one end of the universal joint to which it is directly connected are carried on wheel bearings housed within a pivotally mounted wheel supporting spindle.

Further objects of my invention will appear in the following disclosure of preferred forms of my invention and from the appended claims.

Referring to the drawings in which like reference characters designate like parts:

Figure 1 represents a vertical section taken centrally axially through a wheel mounting embodying the present invention.

Figure 2 is a view in plan to a reduced scale of the two casing members for the universal joint housing.

Figure 3 is a view similar to Figure 1 of a slightly modified form of wheel mounting constructed in accordance with the present invention.

Figure 4 is a view similar to Figures 1 and 3, of another modification.

A detailed description of the embodiment of the invention illustrated by Figure 1 of the drawings will first be given. Referring to Figure 1, an axle housing 11 is connected in any suitable manner with the vehicle which it supports and is adapted to carry an axle drive shaft 12, which is driven by the engine of the vehicle in the usual manner through a differential mechanism (not shown).

The axle shaft 12 has a slightly enlarged portion 14 with which a lubricant sealing device 16 cooperates to prevent escape of lubricant from a universal joint housing generally indicated by the numeral 18 and composed of three casings to be described hereinafter. At its outer end the axle shaft 12 is formed to provide an integral universal joint yoke member 21 forming part of a universal joint which is indicated generally by the reference character 22. The yoke member 21 comprises a pair of identical spaced arms 24 which extend from the body of the yoke to form a fork. The second yoke member 27 of the joint also includes a pair of spaced arms 28 forming a fork for connection to the forked arms 24 of the yoke member 21 by a spider or cross 31. Only one arm 24 appears in the drawings but the yoke construction will be obvious from the complete disclosure of arms 28. The cylindrical body portion 33 of the yoke member 27 has a stub shaft 34 integral therewith which is provided with splines 35 at its outer end for operative driving engagement with the vehicle wheel in a manner to be described.

By forming the shafts 12 and 34 integral with the yokes of the universal joint, the number of parts is reduced and manufacturing costs are considerably lessened. It will be seen, therefore, that in the structure just described, an important feature of the invention is presented in the integral formation of the yoke members of the joint 22 and their operatively connected shafts.

The spider 31, previously mentioned, is in the shape of a cross and has four trunnions 38 formed thereon which are axially aligned in pairs, as is usual for cooperation with the trunnion bearings located in apertures 39 in the spaced arms of the yoke members 21 and 27. Each trunnion is preferably hardened and its surface ground and polished in any suitable way to form a bearing journal.

The universal joint in accordance with the present invention is of the type employing needle bearings for the trunnions 38 whereby the size of the joint for a given power transmitting capacity is materially reduced and the life and efficiency of the joint is greatly increased. To this end, an annulus of individual bearing elements or needles 41 is disposed adjacent and in annular relation to each trunnion 38. As all of the apertures 39, together with their associated bearing elements and trunnions are identical, description will be confined to the aperture which is disclosed in cross-section.

The needles 41 are preferably accommodated in a hardened tubular sleeve 43 seated in the apertures 39 and forming an external bearing race 44 which is ground and polished to provide a suitable bearing surface. The needles 41 are cylindrical in shape with their ends beveled in the form of truncated cones as indicated by reference character 46. The end of the sleeve or race 43 is provided with an inturned flange 48 which has a circular groove 49 in which the conical ends 46 of the needles are received. Clearance at the ends of the needles is provided by forming the groove 49 partly in the inner wall 44 of the sleeve.

The needles are retained in place by the inturned flange 51 of an annular member 52 which is pressed into place over a reduced end portion of the sleeve 43 to effectively confine the needles within the bearing space.

The outer end of aperture 39 is closed by a cover 53 which is secured in place by bolts 54 or other equivalent means. A wire 56 is passed through holes in the heads of the bolts after they have been turned to hold the cover plate against the outer surface of the arm 28, the ends of the wire being twisted to prevent accidental loosening of the bolts. A reduced end portion 58 of the trunnion 38 extends through the opening in the top of the sleeve 43 and contacts with the cover 53 to hold the spider 31 in position within the yoke arms. The inner peripheral surface of the flange 48 cooperates with the shoulder 59 on the trunnion 38 to prevent inward movement of the sleeve 43 and the bearing needles.

With the form of needle bearing just described for the trunnions of the joint, lubricant is furnished to the bearing from a quantity which is supplied within the casing 18 through an opening 61. Escape of lubricant from the housing 18 is prevented by the packing 62 which is seated in an annular groove in one of the housing members. The lubricant can enter the bearing space between the trunnion 38 and the race 44 through the opening provided between the flange 51 and the surface of the trunnion. If desired, the bearings may be provided with a quantity of lubricant sufficient for the life of the bearing at the time of assembly, escape of which can be prevented by a sealing gasket surrounding the trunnion 38 and seated against the annular member 52 and the flange 63 at the base of the trunnion.

Although a needle bearing per se is not a part of the present invention except as it is used in combination with a mounting for a driven steering wheel, the following brief description of the operation of the bearing is given to make clear the description of the novel combinations forming a part of this invention and claimed hereinafter. The width of the annular space between the race 44 and the trunnion 38 is slightly larger than the diameter of the needles 41 and this slight excess width of the space provides a clearance between the needles and the races and is greater than normally used in roller bearing practice to permit the needles to be out of contact with the surface of the trunnion on the unloaded side of the trunnion. This prevents occurrence of a roller bearing action which must be avoided if the needles are to operate properly. The outer race is preferably capable of deformation so that a substantial number of needles will be brought into load carrying contact with the trunnions as the necessary radial clearance between the races and the needles results in the curvature of the outer race being of longer radius than the radius of the outer boundary of the annulus of needles.

No cage or retainer is provided and the needles are of such diameter that a small space is left between each needle and the aggregate space between the needles is preferably less than the diameter of an individual needle. The bearing pressures that may be transmitted in a given size of bearing, because of the use of a relatively large number of needles in the bearing made possible by omission of any form of retainer or cage, allows a decrease in the size of the joint and a more compact wheel mounting. The omission of the cage enables the needles to come in contact with each other and this contact, together with the contact of the needles on the lubricant coated races, tends to retard rotation of the needles about their own axes.

In normal operation with proper lubricant, the bearing becomes a sliding bearing and the annulus of needles becomes a sliding or creeping sleeve or bushing between the races. Proper lubrication of the bearing is assured from the lubricant introduced into the housing 18 by way of the opening 61. The lubricant enters around the trunnion of the bearing in the manner prejustment of the position of the joint becomes necessary in order to bring its center into the steering trunnion axis, the bolts 127 are turned by means of any suitable tool. When adjustment is necessary because of the joint being positioned to the right of its normal position as viewed on Figure 1, the bolts 127 are tightened to draw the shaft 34 to the left against the compressive force of the spring 128. This movement is permitted by the clearance 130 initially provided between the end of the shaft 34 and the member 123. The joint may be adjusted to the right by loosening bolts 127 which permits the spring 128 to move the joint and the unitary shafts associated therewith to the right. Axial movement of the shaft 12 for adjustment is permitted by its splined connection with the differential mechanism usually employed to impart driving power to the vehicle drive wheels or in any other suitable way.

Lubrication of the bearings 107 and 108 is provided for by the lubricant attachment 132 which is in communication with a passage 133 extending into the interior of the hub 102. A packing 134 bears against the inner periphery of the hub 102 to prevent escape of lubricant from around the bearings 107 and 108 and is retained in a circular recess in spindle 99 by a ring 136.

An arm 138 on the housing member 71 is adapted to be connected to a cross link 138a of any design suitable for interconnection with the opposite steering wheel of the vehicle. A bolt 139 acts as a stop to limit steering movements.

The operation of the steering drive wheel mechanism will be clearly understood from the foregoing detailed description of the parts and their structural relationship. Driving rotation of the axle 12 is imparted to the yoke member 21 of the universal joint and then by way of the spider 31 to the yoke member 27. Rotation of the yoke member is transmitted through the splined connection 35 to the driving flange 116 and the wheel hub 102. Due to the upper cap member 88 which is bolted to the vertically split casing 69 this casing will be caused to oscillate for steering purposes when the rod 91 is oscillated. Due to the needle bearings 41, the life of the universal joint is indefinitely prolonged, and the proper operation of the needle bearings is assured by the lubricant which is retained in the housing 18 by the packing member 62 which bears against the outer surface of the member 66 and effectively seals the housing. The convenient and accessible adjustment for the position of the universal joint assures proper operation of the joint at high mechanical efficiency and enables the bearing needles in the joint trunnions to function in the proper manner. The stop 139 may be set to allow a considerable range of steering oscillation as the correct positioning of the joint provided by the present invention permits proper functioning of the joint when the angle between the shafts 12 and 34 is relatively great.

Figure 3 of the drawings illustrates a modified form of the invention incorporated in a wheel mounting similar to that previously described. In this embodiment of the invention the universal joint and the shaft connected thereto are formed separately. As numerous features of construction are common to both Figures 1 and 3, detailed description will be limited principally to the universal joint and the shafts connected thereto.

Referring to Figure 3, the axle housing 11 supports an axle drive shaft 146 which is similar in function to the axle 12 described in connection with Figure 1. The housing member 66 and the housing 18 may be identical in structure with the same parts of Figure 1 previously described. The wheel spindle 99 and the wheel hub 102 and the bearings for the wheel 104 may also be of the same structure as the corresponding parts on Figure 1.

The axle shaft 146 is provided with splines 148 at its outer end for cooperative driving engagement with an internally splined universal joint yoke member 149. Shouldered abutments 150 at the inner ends of the splines 148 serve as stops against which the yoke member may be clamped. This yoke member is otherwise the same as the yoke member 21 and comprises a pair of spaced arms 151 which are connected to the arms 152 of the second yoke member 153 of the universal joint by a spider or cross 154. The trunnion bearings 155 are preferably of the needle bearing type already described in connection with the bearings for the trunnions 38 of Figure 1.

The exteriorly threaded reduced end portion 156 of the axle shaft 146 extends through an aperture in a flat circular washer 158 which is seated within a circular recess 159 formed in the inner face of the yoke member 149. A nut 161 threaded on the reduced end 156 of the axle shaft 146 clamps the yoke member against the abutments 150. A series of radial grooves in the upper face of the nut cooperates with a cotter key 162 inserted in a hole in the end of the shaft to prevent accidental turning of the nut and displacement of the shaft.

Where the shaft 146 is connected to the differential mechanism in such a manner that it is not free to move longitudinally, the shouldered abutments 150 may be omitted. The yoke member will then be free to move on the shaft 146 but such movement would be limited in a manner now to be described in connection with the modified arrangement for adjusting the position of the universal joint with respect to the swiveling axis of the spindle 99.

The inwardly extending hollow sleeve 117 of the driving flange 116 receives the splined end 164 of the stub shaft 166. The opposite splined end 167 of the shaft 166 is received within the splined interior of the body of the yoke member 153 of the universal joint. A washer 168 on the reduced end 169 of the stub shaft seats within the recess 159 and bears against the nut 161 which restrains the yoke 153 from movement toward the right. The helical compression spring 171, which is similar to the spring 128 previously described, engages at one end against the end of the yoke member 153 and reacts at its other end against the end of the sleeve 117. The spring thus tends to move the entire universal joint to the right. The heads of the bolts 172 engaging against the bottom wall of the cap member 123 prevent movement of the universal joint under the influence of the spring 171 in the manner described in connection with bolts 127.

The initial arrangement of the parts is such that a clearance 174 is provided at the end of the stub shaft when the point of intersection of the axial centers of the axle drive shaft 146 and the stub shaft 166 lies on the axial center of the housing trunnions 94. As was explained in connection with Figure 1, the bolts 172 may be tightened to draw the shaft 166 to the left, the washer 168 causing the connected yokes of the universal joint to move with the shaft. Loosenviously described and travels outwardly along the needles. The individual needles forming this creeping sleeve or bushing tend to rotate under load. Under a heavy applied load the force of the load is distributed over a substantial number of needles, which are formed into wedges on opposite sides of the center of the pressure zone. The extent of the wedges varies to a maximum of 90° on each side of the center of the pressure zone.

When there is a relative rotation of the trunnion and the yoke the needles creep and slide in groups until the lubricant film breaks down between the needles under load pressure and the races whereupon the friction developed between the loaded needles and the races is sufficient to cause one or more of the needles to roll about their own axis and pass from one pressure zone or wedge of needles to the other. Because of minute variations in needle diameter, lubricant distribution and other factors, a variable creeping of the sleeve of rollers with variable rotation of the needles under load occurs.

Creeping of the needles in the opposite direction occurs with a reversal or oscillation of the joint in the opposite direction. This variable reverse creeping causes a constant change in position of the needles so that the wear on the needles is distributed which materially prolongs the life of the bearing.

The adjustable feature of the connection between the vehicle wheel and the universal joint stub shaft 34, to be described in detail hereinafter in connection with the description of the casing 18 and its associated parts, facilitates positioning of the trunnion axis of the universal joint in alignment with the swiveling axis of the wheel so that cramping of the trunnion bearings is avoided and therefore these bearings are permitted to operate in the manner outlined above.

The three part housing 18, previously mentioned, which accommodates the universal joint embodies a member 66 which surrounds the end of axle 12 and is secured to the housing 11 by bolts 67 or other suitable means. The opposite end of the member 66 is formed as a hollow spherical casing partially surrounding the universal joint. The housing for the universal joint is completed by a casing 69 (as seen in Figure 2) which comprises two mating sections 71 and 72 joined along a vertical line by bolts 74 extending through marginal flanges 76.

The flanges 76 of the casing members each have two semicircular recesses 79 and 81 which, when the members are assembled, define open ended circular apertures 82. These apertures are diametrically opposite and the flanges 76 have bolt holes 83 to receive bolts 86 securing demountable caps 88 to both casing members. Each cap is provided with an inwardly extending annular portion 89 which is received within its respective circular aperture 82. The upper cap member 88 is provided with an arm 91 which may be formed integrally therewith and extends inwardly of the vehicle. A steering ball 92 is mounted on the arm 91 for cooperation with a link connected to the vehicle steering gear whereby the vehicle is steered. An opening in the upper cap member 88 receives a lubricant attachment 93 whereby grease or oil may be easily inserted into the bearing which lies beneath the cap.

Trunnions 94, each bearing an inner raceway of a roller bearing 95 are carried by the housing member 66. A cup-like member 96 is seated over the upper trunnion and serves to retain lubricant inserted through the attachment 93. The outer ends of the trunnions project into the apertures 82. The outer raceway of each bearing 95 is seated within an aperture 82 against the inwardly projecting annular portion 89 of the caps. Removable shims 97 are adapted to be positioned between the outwardly extending flanges of the caps 88 and flanges 76, the shims functioning as gaskets to prevent loss of lubricant. By insertion or removal of the shims 97 the position of the caps 88 with respect to the casing may be altered to adjust the bearings 95. When the caps 88 are removed, the bearings 95 may be readily inserted in or removed from the apertures 82, whereby new bearings may be readily installed when desired.

A hollow wheel spindle 99 is connected to the casing member 72 by bolts 101, the spindle surrounding the stub shaft 34 of the universal joint. A wheel hub 102 has a radially extending flange 103 to which the wheel 104, such as a disk wheel, is secured by bolts 106. The hub 102 is rotatably supported on the spindle 99 by roller bearings 107 and 108, the bearing 107 being retained between a flange 109 of the hub and a portion of the spindle as illustrated by Figure 1. The roller bearing 108 is retained against a flange 111 on the hub, the inner raceway thereof being adjustably retained by a collar 112 threaded over the end of the spindle 99. The collar is maintained in adjusted position by a threaded washer and a locknut 114.

A driving flange 116, having an inwardly extending hollow sleeve 117 is secured to the hub by bolts 118 or by other suitable means. The sleeve has internal splines 119 at its inner end for cooperative driving engagement with the splined end 35 of the universal joint stub shaft 34 which is longitudinally slidable in the sleeve. The cylindrical body 33 of the universal joint yoke is slidably supported by a bearing bushing 121 positioned within the spindle 99.

The present invention contemplates means for adjusting the position of the universal joint with respect to the axis of the trunnions 94. To this end, a recess is formed by removing the outer ends of the splines 119, and a cap member 123, having a flange 124 is fitted into the outer end of the sleeve 117 with the flange 124 received in said recess and abutting against the outer ends of the internal splines 119. Apertures 126 are provided in the bottom wall of the cap member through which bolts 127 engaged in tapped holes in the end of the shaft 34 pass. A helical spring 128 surrounds the shaft 34 and engages at one end against a shoulder 129 at the end of the cylindrical portion 33 of the universal joint yoke member. The opposite end of the spring 128 reacts against the inner end of the sleeve 117 so that the spring tends to move the universal joint to the right as viewed on Figure 1 of the drawings. Such movement of the joint is limited by the heads of the bolts 127 which lie within the cup member 123 and press against the bottom wall thereof.

The parts are arranged initially so that when the point of intersection of the axes of the shafts 12 and 34 lies in the axis of the trunnions 94, a clearance designated by the reference character 130 exists between the end of the shaft 34 and the inner end of the cap member 123. The spring 128 acting against the shoulder 129 maintains this clearance and holds the universal joint in its proper position of adjustment. When ading the bolts 172 permits the spring to move the universal joint to the right. Axial movement of the yoke member 149 with respect to the shaft 146 may be permitted by the splined connection 148, however it will be understood that the shaft is solidly connected to yoke member 149 by shoulders 150 and nut 161 when the shaft is slidably connected as by splines to the differential mechanism or other drive means used to impart driving power to the shaft 146.

The operation of the form of steering drive wheel mechanism just described will be obvious from the description of the operation of the embodiment of the invention disclosed by Figure 1 of the drawings. The spring 171 holds the universal joint in the proper position with respect to the axis of the trunnions 94 and manipulation of the bolts 172 in the manner previously explained returns the joint to this position when adjustment is necessary. The yokes 149 and 153 are substantially identical in structure and therefore the joint may be reversed when it is installed in the wheel mounting.

Figure 4 of the drawings illustrates a modified form of wheel mounting wherein the wheel bearings are enclosed within the hollow wheel spindle. Referring to this figure in detail, numeral 176 designates an axle drive shaft which is supported within an axle housing 177, the latter being interconnected in any suitable manner with the vehicle which it supports. A housing member 179 is secured by suitable means, as bolts and nuts 181 to the axle housing 177 and comprises a sleeve-like body 182 and outwardly extending spaced arms 183 and 184 for a purpose to be described.

A sealing gasket 186 of cork or other suitable material surrounds the shaft 176 and is seated in a recess in the end of the housing member 179 to seal the axle housing 177 against dirt and moisture and to prevent escape of lubricant from the drive mechanism contained therein. The outer end of the axle drive shaft is secured within the body portion of a yoke member 188 of the universal joint 189 by a set screw 191 preferably of the headless safety type shown. A bushing 193 seated in a recess in the inner surface of the sleeve-like body 182 rotatably supports the cylindrical body portion of the yoke member 188.

The previously mentioned spaced arms 183 and 184 of the housing 179 have axially aligned apertures 194 and 196 respectively within which, and seated against a shoulder therein, are mounted the outer raceways of the roller bearings 197. A hollow spindle 199 has an enlarged flaring portion 201 which fits over the arms 183 and 184 of the housing 179. A pair of trunnions 202 are received in apertures 204 in the ends of the portion 201 of the spindle which overlie the arms 183 and 184 and are retained in the position by bolts 206 or other suitable securing means. These trunnions may, if desired be of substantially the same diameter as the apertures 204 so that they will be held securely in position by a press fit.

The inner ends of the apertures 194 and 196 are preferably provided with suitable means for excluding dirt from and retaining lubricant in the bearings 197. Suitable means similar to grease fitting 93 may be used to supply lubricant to the bearings.

The inner raceway of one of the roller bearings 197 fits over the inner end of each trunnion, which is reduced in cross section, and seats against a shoulder 207. Removable shims 208 may be inserted or removed from beneath the heads of the trunnions to alter the position of the trunnions and the inner raceways of the bearings 197 with respect to the outer raceways, thereby providing a means of adjusting these bearings.

The bearings 209 and 210 for the vehicle wheel 211 and its driving connection with the universal joint 189 are located within the interior of the spindle 199. The road wheel 211, of the disc type illustrated by the drawings, and the brake drum 212 are secured by bolts 214, or other equivalent fastening means, to a unitary wheel carrying and driving member 216 which has a drive shaft 217 formed integrally therewith. The inner splined end of this drive shaft, indicated by the reference character 218 is received within the splined interior of the cylindrical body portion of yoke member 219 of the universal joint.

The inner raceway of the wheel bearing 209 encircles the shaft 217 and bears against the wheel carrying member 216. A spacing sleeve 221 also encircles the shaft 217 and is clamped between the wheel bearing raceway and the end of the universal joint yoke 219 by means of a nut 222 which is screwed on a reduced threaded extension of the shaft. A cotter key 223 extending through a hole in the threaded extension of the shaft engages in one of a series of radial grooves formed in the top of the nut to prevent accidental loosening of the nut.

The inner raceway of the bearing 210 is carried by the body portion of the universal joint yoke member 219 and the outer raceways for the bearings 209 and 210 are positioned in recesses at each end of the interior of the hollow spindle 199. Removable shims 224 between the raceway of the bearing 209 and the adjacent end of the spacing sleeve 221 provide for adjusting the wheel bearings. When play or looseness is to be eliminated, one or more of the shims are removed and the nut 222 turned the necessary amount to clamp yoke member 219 against the spacing sleeve 221. The initial arrangement of the parts is preferably such that the center of the universal joint 189 is located on the axial centers of the trunnions 202.

The brake anchor plate 226 which carries the brake shoes 227 is mounted concentrically on the spindle 199 and is secured in position by bolts 228 which engage threaded openings in the enlarged portion 201 of the spindle.

Escape of lubricant from the outer end of the spindle 199 is prevented by the grease seal ring 229 of felt or other suitable material which is carried in a groove formed in the exterior surface of the spindle 199 and cooperates with a flange on the brake drum 212. The inner end of the spindle is sealed by a packing 231 which is secured between a cuplike member 232 and a plate 233 which are clamped in position on the yoke 219 by the inner race of the bearing 210. A conical member 234 of sheet metal held in position by the bolts 214 serves to keep any small amount of lubricant which may leak past the grease seal ring 229 from the braking surface of the brake drum 212.

The yokes 188 and 219 of the universal joint are operatively connected by the trunnion member 236 which is provided with two sets of diametrically opposite trunnions adapted to be received in bearings in the spaced arms of the yokes. These trunnion bearings are preferably of the needle bearing type previously described in connection with the embodiment disclosed in Figure 1 of the drawings. As the universal joint is not fully enclosed by the housing 179, the trunnion bearings are preferably designed to retain a sufficient quantity of suitable lubricant substantially without leakage which will last for the life of the bearings.

An arm 237 integral with the outer end of the upper trunnion is provided with a steering ball 238 for connection in any manner with the steering linkage of the vehicle supported by the wheel mounting just described. The spindle 199 is interconnected with a similar spindle of the wheel mounting on the opposite side of the vehicle by suitable means (not shown) so that the vehicle may be properly steered by the vehicle steering gear which is connected to the steering ball 238.

The operation of the embodiment of the wheel mounting just described will be clearly understood from the description just given. The universal joint yoke member 219 and the wheel mounting member are supported by the wheel mounting bearings 209 and 210. These bearings are enclosed within the hollow spindle 199 which also serves to hold the brake anchor plate in proper position for presenting the braking surfaces of the brake shoes against the inner periphery of the brake drum 212 when the vehicle brakes are actuated.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a steering wheel drive, a wheel spindle, a vehicle axle to which said spindle is pivoted for steering movements, a universal joint, means for driving said universal joint, a driving connection from said universal joint to a road wheel rotatably carried by said spindle, and positive adjusting means in said driving connection for drawing said universal joint toward the road wheel to properly position the joint with respect to the pivotal axis of said spindle.

2. A steering wheel construction comprising a universal joint, a stationary vehicle axle, a stub shaft connected to one member of said joint, a spindle pivotally connected to said axle, splines on the end of said stub shaft, a wheel hub having splines on its inner surface engaged with the splines of said shaft, means acting between said stub shaft and said hub tending to move said shaft and said universal joint in one direction and adjustable means to limit movement of said universal joint under the influence of said first mentioned means whereby said joint may be adjustably positioned with respect to the pivotal axis of said spindle.

3. The combination of claim 2 wherein said means tending to move said stub shaft and said universal joint comprises a spring acting between said universal joint and said wheel hub, and said adjustable means comprises a bolt extending through an axial opening in said wheel hub and engaged in a threaded aperture provided in the end of said stub shaft.

4. A steering wheel construction comprising a stationary vehicle axle, a spindle pivotally connected to said axle, a universal joint, a stub shaft carrying one member of a universal joint that is axially inseparable therefrom, splines on the end of said stub shaft opposite said universal joint, a wheel hub having splines on its inner surface engaged with the splines of said shaft, a spring surrounding said stub shaft and bearing against said universal joint member and said wheel hub and tending to move said stub shaft and said universal joint member axially, and a member provided on one end with screw threads, projecting through an aixal opening in said wheel hub, means on said screw threaded member for preventing axial movement thereof with respect to said wheel hub in response to action of said spring, the threaded end of said member being engaged with a threaded aperture provided in the end of said stub shaft whereby said universal joint may be adjusted with respect to the pivotal axis of said spindle.

5. A steering wheel drive construction comprising a universal joint having two members rotatable together, a housing for said joint, a stub shaft extending rigidly from one member of said joint and having a splined end, a spindle pivotally mounted on said housing and surrounding said stub shaft, a wheel hub having a sleeve with splines on its inner surface engaged with the splines of said shaft, a spring bearing against said universal joint member and the adjacent end of said sleeve and tending to move said universal joint axially, a plate disposed within said sleeve and having means for limiting its inward axial movement, and a bolt threadedly engaged in a threaded axial bore in said stub shaft and engaging said plate to maintain the universal joint in position with respect to the pivotal point of said spindle.

6. In the combination defined in claim 5, said splines within the hub terminating short of the outer edge thereof, and said limiting means of the plate comprising a peripheral portion abutting the ends of said hub splines.

7. In a steering wheel drive construction, a pair of shaft sections intercoupled by a universal joint, a pair of housing structures surrounding said shaft sections and provided with a pivotal interconnection in proximity to said universal joint, a steering wheel assembly supporting one of said housing structures and adjustable means for properly locating said universal joint axially with respect to said pivotal interconnection, said means comprising a resilient device constantly urging said shaft sections axially of said housing structures in a direction inwardly from the steering wheel assembly, and a device for adjustably shifting said shaft sections axially in the opposite direction and for positively limiting their inward movement.

8. In a steering wheel drive construction, a pair of shaft sections intercoupled by a universal joint, a pair of housing structures surrounding said shaft sections and provided with a pivotal interconnection in proximity to said universal joint, a steering wheel assembly supporting one of said housing structures and adjustable means for properly locating said universal joint axially with respect to said pivotal interconnection, said means comprising a member in abutting engagement with said wheel assembly and in screw threaded variable engagement with one end of one of said shaft sections.

BEVERLY W. KEESE.